(12) United States Patent
Crossman, II et al.

(10) Patent No.: US 7,537,477 B2
(45) Date of Patent: May 26, 2009

(54) POWER CABLE TENSION CONTROL DEVICE

(76) Inventors: Ralph B. Crossman, II, 3491 Highland Ave., Carlsbad, CA (US) 92008; Laurel A. Crossman, 3491 Highland Ave., Carlsbad, CA (US) 92008

( * ) Notice: Subject to any disclaimer, the term of this patent is extended or adjusted under 35 U.S.C. 154(b) by 0 days.

(21) Appl. No.: 11/649,687

(22) Filed: Jan. 4, 2007

(65) Prior Publication Data

US 2008/0164052 A1  Jul. 10, 2008

(51) Int. Cl.
 *H01R 13/62* (2006.01)
(52) U.S. Cl. .................. 439/373; 439/369; 439/148; 174/135; 246/49; 246/65; 246/74.1
(58) Field of Classification Search ............ 439/369, 439/373, 501, 528, 148; 248/49, 65, 74.1; 174/53, 61, 64, 67, 68.1, 135
See application file for complete search history.

(56) References Cited

U.S. PATENT DOCUMENTS

| | | | | |
|---|---|---|---|---|
| 3,838,383 A * | 9/1974 | Wilbur et al. | ............... | 439/472 |
| 3,942,750 A * | 3/1976 | Noorily | ..................... | 248/74.3 |
| 4,498,651 A * | 2/1985 | Allen | ........................ | 248/65 |
| 4,662,697 A * | 5/1987 | Moses | ........................ | 439/148 |
| 5,769,646 A * | 6/1998 | Cavello et al. | ............. | 439/136 |
| 5,821,469 A * | 10/1998 | Shanmugham | .............. | 174/135 |
| 5,922,997 A * | 7/1999 | Lecinski | ..................... | 174/135 |
| 6,200,155 B1 * | 3/2001 | Chudkosky et al. | ......... | 439/371 |
| 6,491,541 B2 * | 12/2002 | Wakino | ...................... | 439/451 |
| 6,520,792 B2 * | 2/2003 | Chen-Chiang et al. | ...... | 439/373 |
| 6,648,280 B1 * | 11/2003 | Chong | ........................ | 248/68.1 |
| 6,939,161 B1 * | 9/2005 | Yi et al. | ...................... | 439/373 |
| 7,052,305 B2 * | 5/2006 | Kurokawa | ................... | 439/371 |
| 2006/0278427 A1 * | 12/2006 | Mahoney et al. | ............ | 174/135 |

* cited by examiner

*Primary Examiner*—Tho D Ta
(74) *Attorney, Agent, or Firm*—Biotech Beach Law Group, PC; Raymond Wagenknecht (57) ABSTRACT

The present invention includes a power cable tension control device having at one end an adapter capable of insertion into a computer port and at the opposing end a cable retaining structure for retaining a power cable, such as an AC power cable. The adapter does not electrically communicate with the retained power cable and therefore does not act as a conduit through which the power cable electrically communicates with the computer. The computer cable communicates with the computer using a port away from the adapter. Thus, the present invention provides a device that further anchors the power cable to the computer thereby reducing strain on the plug region of the power cable or the computer port, which prolongs the life of the power cable or computer port.

9 Claims, 9 Drawing Sheets

FIG.1

Side View(s)
FIG. 2A

Top View(s)
FIG. 2B

POWER CABLE TENSION CONTROL DEVICE

TECHNICAL FIELD

The present invention relates to devices for securing electronic cables and more specifically to a power cable tension control device that uses an available computer port to further anchor the AC power cable.

BACKGROUND OF THE INVENTION

Computers are routinely used throughout the world. The emergence of laptop and palmtop computers encourages our development as an increasingly mobile computer society. However even laptop and palmtop computers require a power cable or at least temporary connectivity through some form of an AC power cable. These power cables provide a means to supply electrical current to the laptop computer and to charge the battery typical of all laptop computers. Power cables typically include a jack at one end for insertion into a corresponding power port on the computer.

Mobile computer users frequently place the computer on the lap and plug in the AC power cable. However, when the computer is moved or adjusted, strain on the power cable or computer power port may occur. Continual or routine strain leads to an inoperable power cable or computer AC power port. Damaged AC power cables must be repaired or replaced. When the computer AC power port is inoperable the laptop computer can only function on its battery power, repair or replacement of the AC power port can be quite costly. Therefore there is a need to develop products that extend the life of computer AC power ports and computer AC power cables.

SUMMARY OF THE INVENTION

The present invention addresses the need to develop products that extend the life of computer AC power cables and computer AC power ports and provides related benefits. Although the present invention can be used with essentially any computer in need thereof, it provides a particular utility for mobile computers, such as laptop computers (also referred to as notebook computers) and palmtop computers. The present invention provides a device that extends the life of a computer AC power cable and a computer AC power port by reducing the tension or force applied to a AC power cable, AC power plug or AC power computer port during use. The present invention includes a proximal end for insertion into a computer port and a distal end for retaining the power cable. The power cable does not electrically communicate with the computer through the device of the present invention, but instead relies on its own corresponding port.

The present invention incorporates an adapter, which includes a connector, configured for insertion into at least one of a variety of computer ports. Connectors and corresponding ports of particular interest include but are not limited to a 2.5 stereo jack, a 3.5 stereo jack, a 6.3 stereo jack, a BNC connector, a DB9 connector, a DB15 connector, a DB37 connector, a DB50 connector, a DVI-I connector, a Type F connector, a HDMI connector, a IEEE1394 connector, a Mini-DIN 4 connector, a Mini-DIN 6 connector, a Mini-DIN 8 connector, a Mini-DIN 13.2 connector, a Mini-VGA connector, a RCA connector, a RJ11 connector, a RJ12 connector, a RJ45 connector, a USB "A" connector and a USB Mini A connector. One skilled in the art to which the present invention belongs can fabricate a connector for any available computer port.

In one aspect of the present invention a power cable tension control device is disclosed including an adapter, which includes a connector capable of connecting to a computer port and a male component capable of receiving a female component, and a cable retaining structure including a female component capable of receiving the male component and capable of receiving or retaining a power cable. The male and female components may reversibly interlock such as through interlocking surfaces. In some embodiments the female component is generally U-shaped allowing the power cable to be slid through the open portion then along the inner portion of the component until reaching the closed portion of the U. The male component may then be inserted, optionally until contacting the power cable, thereby preventing the power cable from sliding out of the female component. In further embodiments an adjusting component is provided for two way adjusting or adjustment along multiple planes or directions.

In another aspect of the present invention a power cable tension control device is disclosed including an adapter including a connector capable of connecting to a computer port and a female component capable of receiving a male component, and a cable retaining structure including a male component capable of receiving the female component and capable of receiving or retaining a power cable. The computer cable does not electrically communicate with a computer through the adapter. The female and male components may be fixed or may reversibly receive one another such as through the use of reversibly engaging complementary interlocking surfaces. In further embodiments, the device also includes a one-way, two-way or three or more way adjusting component positioned between the connector and the female component. In other embodiments the cable retaining structure includes a clamp capable of clamping the power cable.

In another aspect of the present invention a power cable tension control device is disclosed including a proximal end capable of connecting to a computer port and a distal end capable of receiving a power cable. The computer cable does not electrically communicate with a computer through the proximal end. In further embodiments the device also includes an adjusting component positioned between the proximal and distal end for adjustment along one or more planes.

BRIEF DESCRIPTION OF THE DRAWINGS

FIG. 2 demonstrates joining the adapter 12 to the cable retaining structure 16 to form an assembled unit 28. Assembling includes joining the male component 18*a* and female component 18*b* such that the interlocking teeth 20*a* and 20*b* interlock. Also depicted is a connector flange or base 15.

FIG. 6 is a top and corresponding side plan view depicting an adapter 12 incorporating an adjusting component 36 having a hinge configuration for two way adjustment of the male component 18a.

FIG. 7 is a top and corresponding side plan view depicting an adapter 12 incorporating an adjusting component 36 having a ball and socket configuration for multi-plane movement of the male component 18a.

DETAILED DESCRIPTION OF THE INVENTION

The present invention provides a power cable tension control device 10 for reducing the strain placed on a power cable 22 or a computer port, which extends the life of the power cable 22 or computer port under typical use. The term "power cable" as used herein refers to any cable that delivers an electrical signal to a computer such as but limited to an AC power cable, an Ethernet cable, a phone line cable, a speaker cable, a mouse cable, a keyboard cable and the like. The device 10 may be used whenever an available computer port exists.

More specifically, the present invention includes a device 10 having at one end an adapter 12 capable of insertion into a computer port and at the opposing end a cable retaining structure 16 for retaining a power cable 22, such as an AC power cable. The adapter 12 does not electrically communicate with the retained power cable 22 and therefore does not act as a conduit through which the power cable 22 electrically communicates with the computer. The power cable 22 communicates with the computer using its regular corresponding computer port and not through the present device 10. Thus, the present invention provides a device 10 that further anchors the power cable 22 to the computer thereby reducing strain on the plug region of the power cable 22 or the computer port, which prolongs the life of the cable plug or computer port. A variety of non-limiting configurations have been developed by the inventor, which supports a broad interpretation of the present invention.

Figure 1:
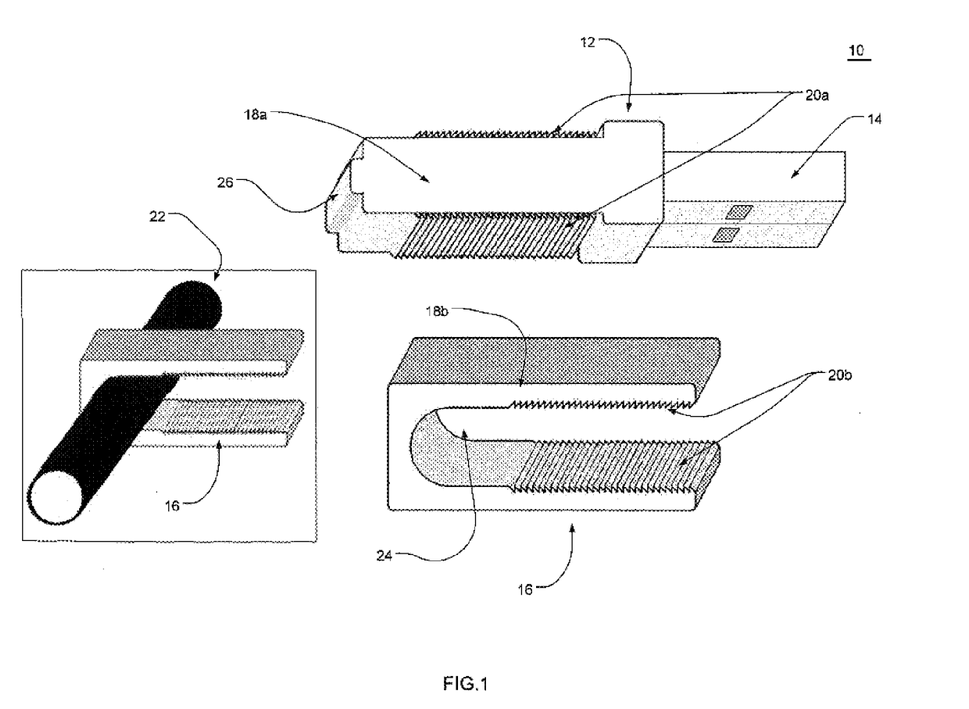
FIG. 1 is an elevated front right view of one aspect of a power cable tension control device 10 including an adapter 12 having a connector 14 and capable of attachment to a cable retaining structure 16 via joining a male component 18*a* and a female component 18*b*. The male 18*a* and female components 18*b* are depicted as having interlocking teeth (20*a* and 20*b*). The cable retaining structure 16 retains a power cable 22 in a power cable area 24. The adapter 12 is also depicted has including a cable stop 26.
Figure 2A:
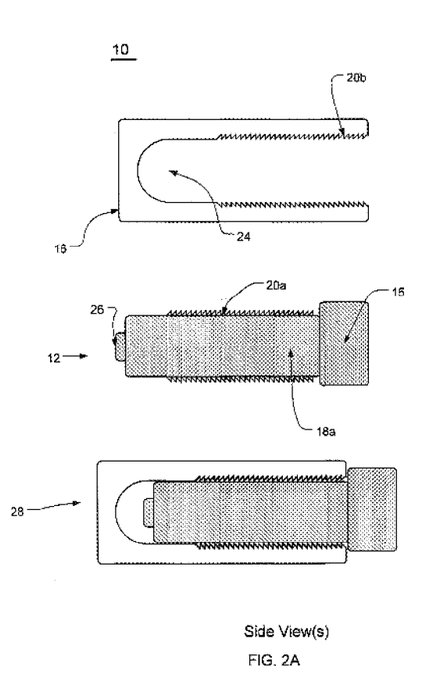
FIG. 2A is a side plan view and FIG. 2B is a top plan view of the power cable tension control device 10.
Figure 2B:
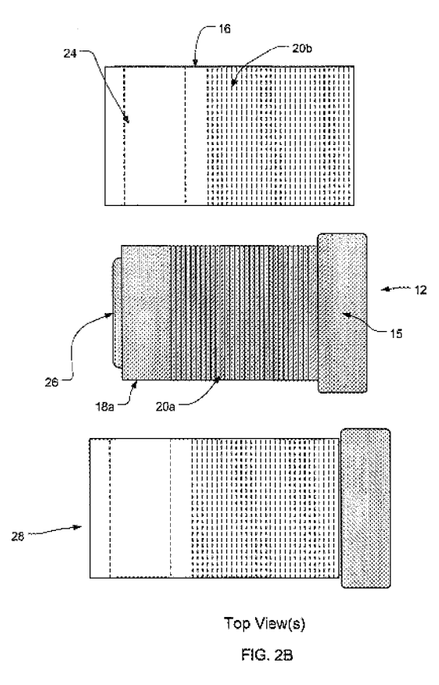

Referring to FIGS. 1 and 2, in one aspect of the present invention a power cable tension control device 10 is disclosed including an adapter 12, which includes a connector 14 capable of connecting to a computer port and a male component 18a capable of receiving a female component 18b. The invention also includes a cable retaining structure 16 including a female component 18b capable of receiving the male component 18a and capable of retaining a power cable 22, such as an AC power cable.

As can now be envisioned by one skilled in the art, the power cord tension control device 10 may be utilized with a variety of electronic devices. As non-limiting examples, the present invention may be utilized with computers such as a desktop computer, a laptop computer or notebook computer and a palmtop computer. Alternatively the device 10 may be used with any electronic device that utilizes a power cable 22 and has a port available for receiving a connector 14 such as a portable DVD player, a radio and the like. Any electronic device that utilizes a power cable 22 and has an available port for insertion of a connector 14 is encompassed within the term "computer."

The power cable tension control device 10 includes an adapter 12 for adapting the device 10 for use with a variety of computer ports. The adapter 12 includes a connector 14, which can connect to a specific computer port, and a means to attach the connector 14 to the cable retaining structure 16. The power cable tension control device 10 may include a single adapter 12 with a single connector 14 or may include multiple adapters 12, each having a single but different connector 14. Therefore in some embodiments, the adapter 12 allows the connector 14 to be interchanged depending on the desired computer port. In still other embodiments multiple connectors 14 may be provided on a single adapter 12.

Figure 5:
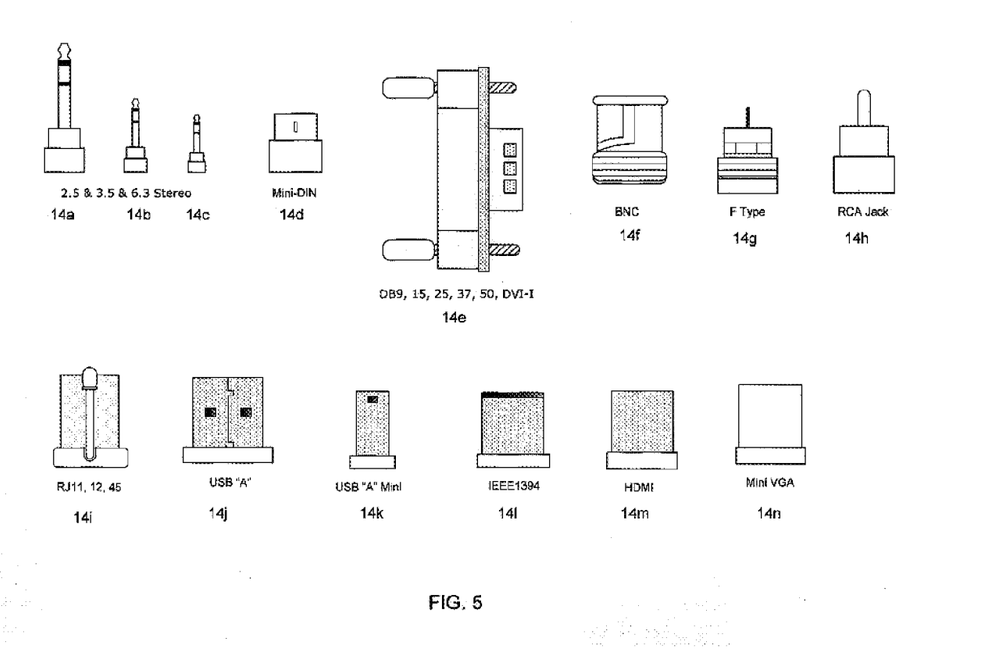
FIG. 5 is a top plan view depicting a variety of non-limiting connectors 14 that may be used with the present invention including a 2.5 stereo connector 14a, a 3.5 stereo connector 14b, a 6.3 stereo connector 14c, a Mini-DIN connector 14d, a DB9, 15, 37, 50 or DVI-I connector 14e, a BNC connector 14f, a F type connector 14g, a RCA jack 14h, a RJ11, 12 or 45 connector 14i, a USB "A" connector 14j, a USB "A" Mini connector 14k, a IEEE 1394 connector 14l, a HDMI connector 14m, a Mini VGA connector 14n.

Since the adapter 12 includes a wide variety of connectors 14, the power cable tension control device 10 may be adapted for use with any available computer port already in existence or yet to be developed. Referring to FIG. 5, as non-limiting examples the adapter 12 may utilize the following connectors 14: a 2.5 stereo jack, a 3.5 stereo jack, a 6.3 stereo jack, a BNC connector, a DB9 connector, a DB15 connector, a DB37 connector, a DB50 connector, a DVI-I connector, a Type F connector, a HDMI connector, a IEEE1394 connector, a Mini-DIN 4 connector, a Mini-DIN 6 connector, a Mini-DIN 8 connector, a Mini-DIN 13.2 connector, a Mini-VGA connector, a RCA jack, a RJ11 connector, a RJ12 connector, a RJ45 connector, a USB A connector and a USB Mini A connector. As can now be envisioned by one skilled in the art, connectors may be fabricated for any suitable computer port. Although the connector 14 connects the device to a computer port, the power cable 22 does not electrically communicate with the computer through the connector 14.

The connector 14 may be fabricated from any suitable material and using methods known in the computer jack fabrication arts or injection moulding arts. In the preferred embodiment, the connector 14 is fabricated to mimic the appearance of a useable connector (e.g. a USB connector for a USB port). The connector 14 may be fabricated from a material that conducts electricity or a non-conducting material. As non-limiting examples, the connector 14 may be constructed from metal, metal alloy, plastic, rubber and the like. The connector 14 may be formed then fused to a male or female component 18 to form an adapter 12, such as by forming a connector flange or base 15. Alternatively the connector 14 may be cast together with a male or female component 18 to form an adapter 12.

The primary components of the device 10 (e.g. adapter 12 and cable retaining structure 16) are joined utilizing a complementary male component 18a and a female component 18b. Male and female components 18 may be interchanged between the adapter 12 and the cable retaining structure 16 depending on the desired embodiment. The male and female components 18 may interlock such as through interlocking surfaces or reversibly interlock such as through reversibly interlocking surfaces. Thus, the male and female components 18 may be joined using male to female joining techniques known to those skilled in the art to which the present invention belongs. Among these include the use of complementary surfaces such as snaps, slides, grooves, hooks, buttons 34, recesses 32 and the like. The male and female components 18 may further include complementary locking teeth 20. Alternatively, the male component and female components 18 may include a series of prongs and corresponding insertion apertures for insertion of the prongs. Complementary male and female components 20 may be constructed using conventional injection moulding techniques and may utilize a variety of materials such as metal, metal alloy, plastic or rubber. In the preferred embodiment the male and female components 20 are injection moulded plastic.

In the preferred embodiment a set of complementary angled teeth 20 are provided along the male and female components 18 allowing the male component 18*a* to slide directly into the female component 18*b*. The degree of insertion may be gauged or determined by the number of engaged or interlocked teeth 20. Thus, the teeth 20 may be used in combination with the male and female components 18 to adjust the size of a cable area 24. In this embodiment the male component 18*a* may be removed by sliding the male component 18*a* perpendicular to the route of insertion. Thus, removal occurs by sliding the male and female components 18 across one another.

Figure 8:
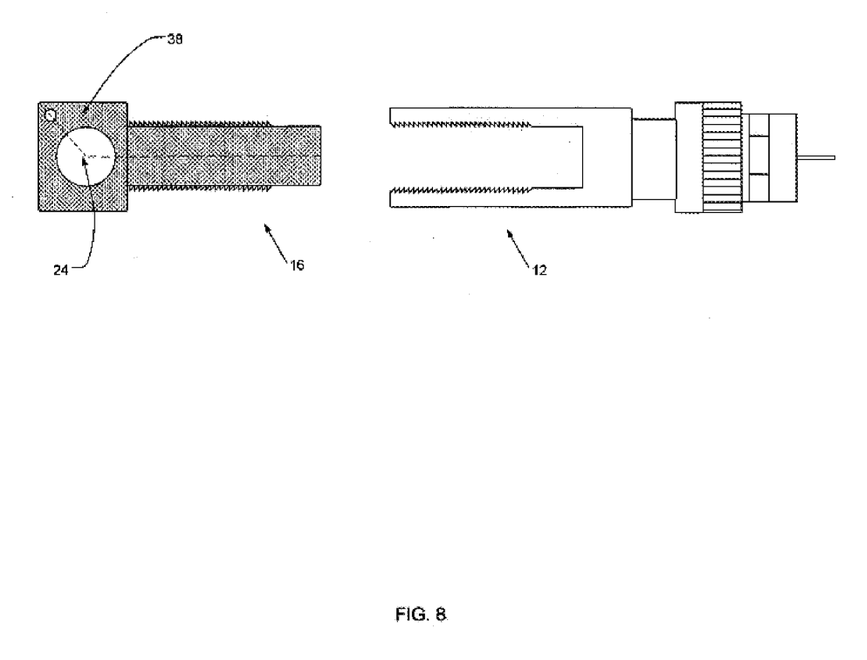
FIG. 8 is a side plan view of an embodiment incorporating a cable retaining structure 16 having a clamp 38 able to open and close, which forms the cable area 24.
Figure 9:
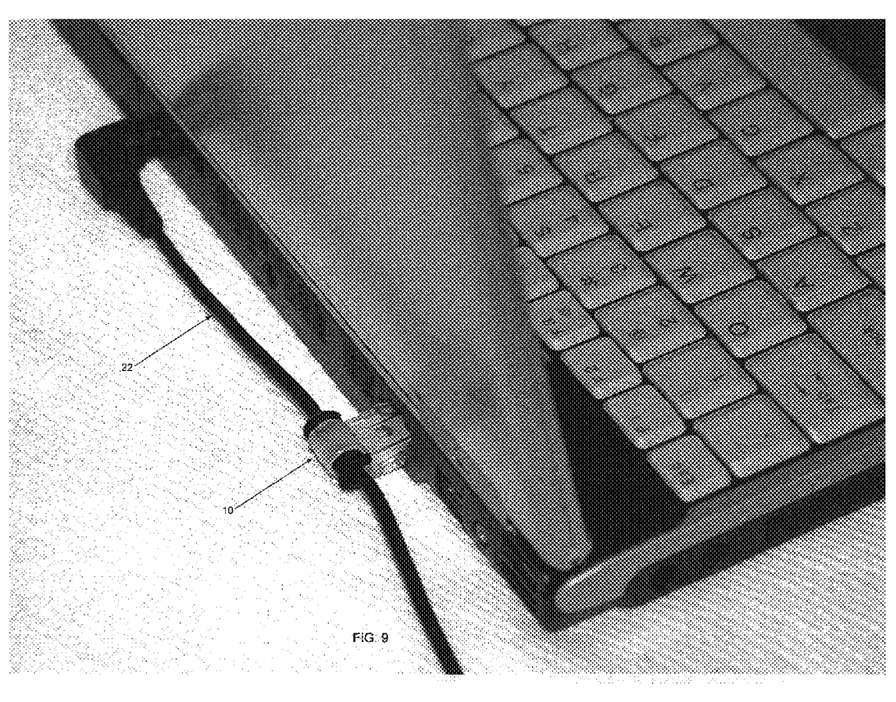
FIG. 9 is an elevated front right view demonstrating the device 10 retaining a power cable 22 and connected to a computer port.

The power cable 22 or AC power cable is retained within a cable area 24 of the cable receiving structure 16. The cable area 24 may be adjustable to accommodate a variety of sized power cables 22. The cable area 24 may be the closed end of a U-shaped cable receiving structure 16 or may be a clamp 38 (e.g. as depicted in FIG. 8) able to open and close positioned at the distal end of the cable receiving structure 16 or the distal end of the device 10. The particular configuration may depend on the desired characteristics of the device. For example, a cable area 24 positioned along the closed end of a U-shaped cable receiving structure 16 may be desired when using a male component 18*a* to adjust the size of the cable area 24. Alternatively if removal of the cable 22 is desired prior to removing the connector 14 from a computer port, the cable area 24 may be provided as a clamp 38 positioned at the distal end of the cable receiving structure 16, which is capable of reversibly clamping the power cable 22 whether or not connected to a computer.

In the preferred embodiment, which is depicted in FIGS. 1 and 2 the adapter 12 includes a connector 14 and a male component 18*a*. In this embodiment the cable retaining structure 16 is generally U-shaped, includes a cable area 24 towards the closed end of the structure for receiving a power cable 22 and includes a female component 18*b* capable of joining the male component 18*a*. The male and female components 18 are further secured or reversibly locked via interlocking angled teeth 20*a* and 20*b*. The preferred embodiment also includes a cable stop 26 positioned at the end opposite the connector 14 on the adapter 12, also referred to as the distal end of the adapter 12. Referring to FIG. 2, assembly may include slidably inserting the male component 18*a* into the female component 18*b* such that the interlocking teeth 20 interlock. Disassembly may include sliding the male component 18*a* across (or crosswise) the female component 18*b* until disassembled. Therefore operation of the device 10 includes sliding a power cable 22 through the female component 18*b* until the cable area 24 is reached, sliding the male component 18*a* into the female component 18*b*, optionally until the cable stop 26 contacts the power cable 22, and inserting the connector 14 into the corresponding computer port, thereby securing or physically controlling the power cable 22. The device 10 may be disassembled by disconnecting the connector 14 from the computer port, and sliding the male component 18*a* across the female component 18*b* until removed and removing the power cable 22 such as by sliding the cable 22 out through the female component 18*b*.

Figure 3:
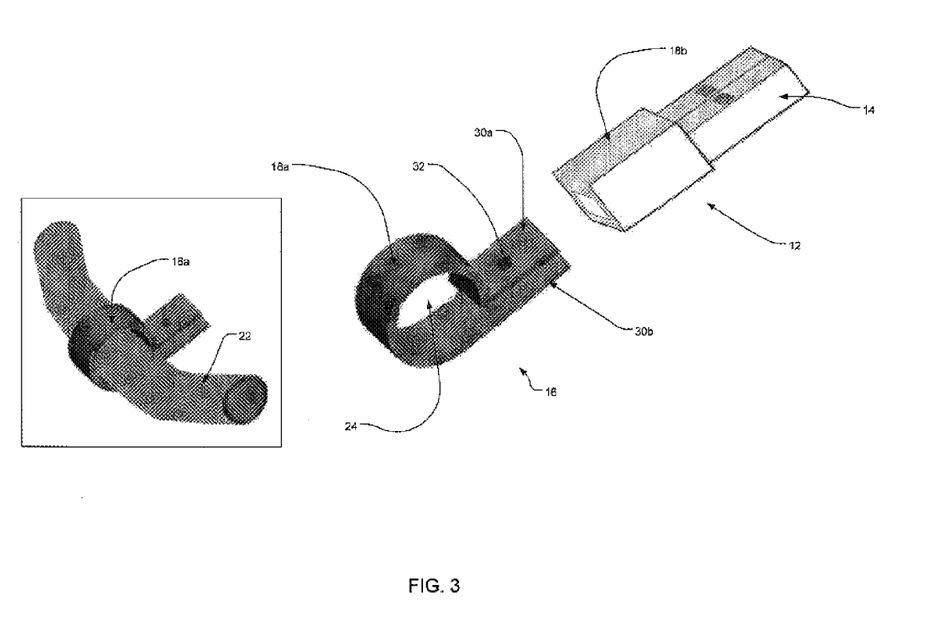
FIG. 3 is an elevated front right view of another aspect of the present invention including an adapter 12 having a connector 14 and capable of joining to a cable retaining structure 16. In this configuration, a male component 18*a* is provided as part of the cable retaining structure 16 and the female component 18*b* is provided as part of the adapter 12. In this embodiment, the male component 18a includes two arms 30a and 30b, arm 30a shown having a lockable recess 32 to reversibly lock the male component 18a and female component 18b.
Figure 4:
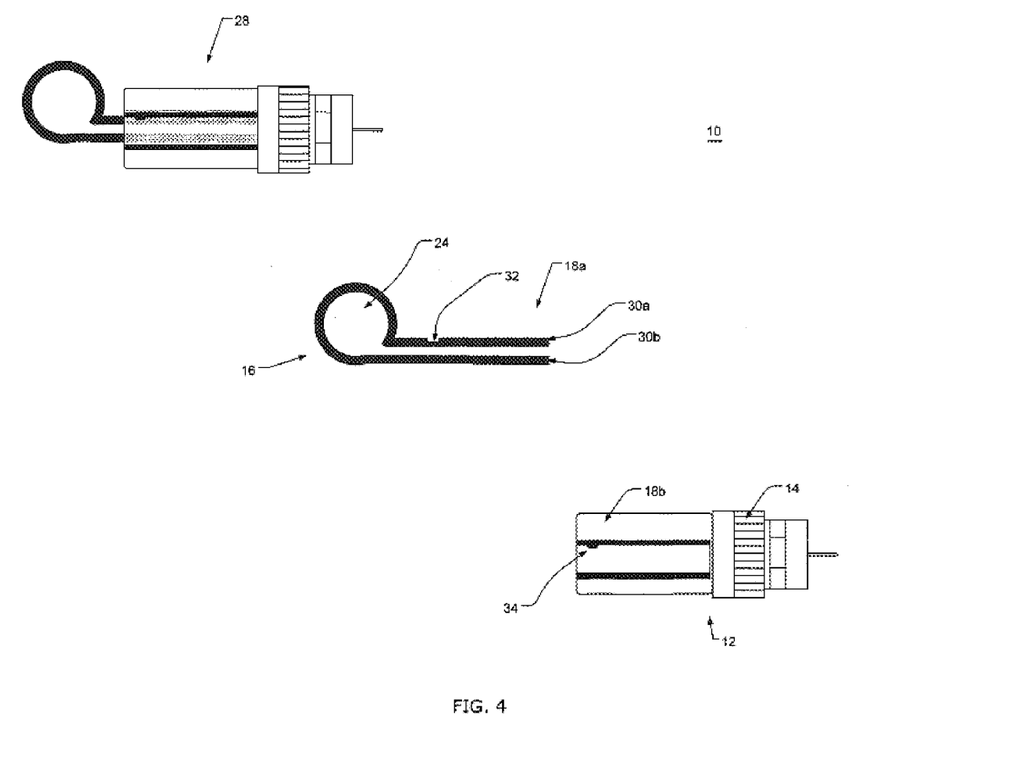
FIG. 4 is a side plan view of the device 10 demonstrating assembly of a cable retaining structure 16 including a male component 18a and an adapter 12 including a female component 18b. The two arms 30 are inserted into the female component 18b until the lockable recess 32 contacts a lockable button 34. An assembled unit 28 is also shown.

In another embodiment, which is depicted in FIGS. 3 and 4, the adapter 12 includes a connector 14 and a female component 18*b*. In this embodiment the cable retaining structure 16 includes the male component 18*a*, and the adapter 12 includes the female component 18*b*. As shown in FIG. 3 the male component 18*a* may include two substantially parallel arms 30, for insertion into the female component 18*b* and may have a button recess 32 on at least one arm 30*a* or 30*b* or both arms 30*a* and 30*b* for accepting a locking button 34. The two arms 30 may be slightly squeezed together when being inserted into the female component 18*b* or when being removed from the female component 18*b*. The two arms 30 may be spread apart if sliding a power cable 22 between the arms 30 or if sliding a power cable 22 directly into the cable area 24 prior to insertion into the female component 18*b*. Operation of the device 10 depicted in FIGS. 3 and 4 includes: sliding the power cable 22 either between the arms 30 until the cable area 24 is reached or directly inserting the power cable 22 into the cable area 24 (optionally by enlarging the cable area 24 by spreading apart the arms 30), the male component 18*a* is inserted into the female component 18*b* of the adapter 12 until the reversibly locking button 34 locks into the recess 32, and the connector 14 is connected to a corresponding computer port on a computer, such as a laptop or palmtop computer.

Figure 6:
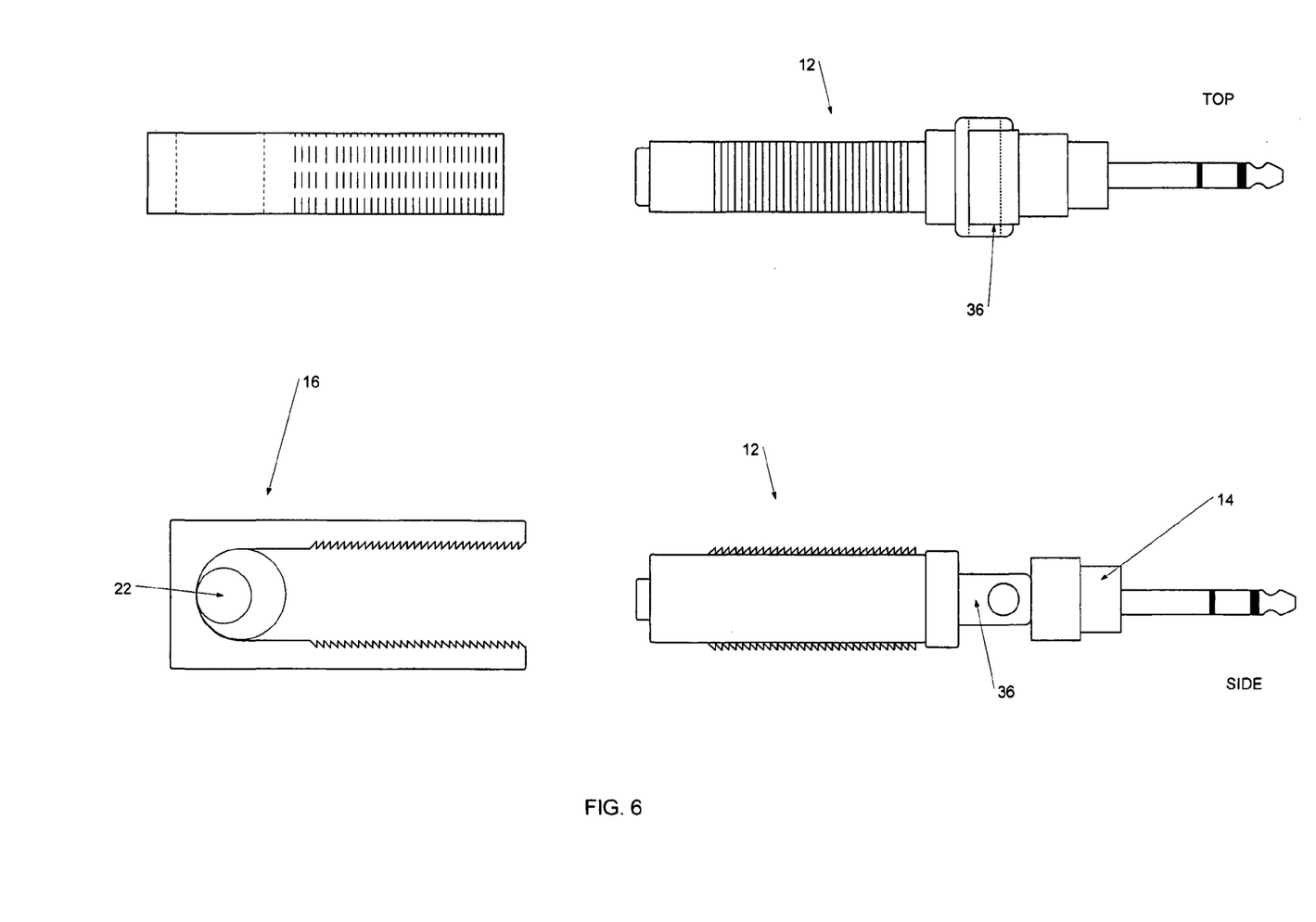
Figure 7:
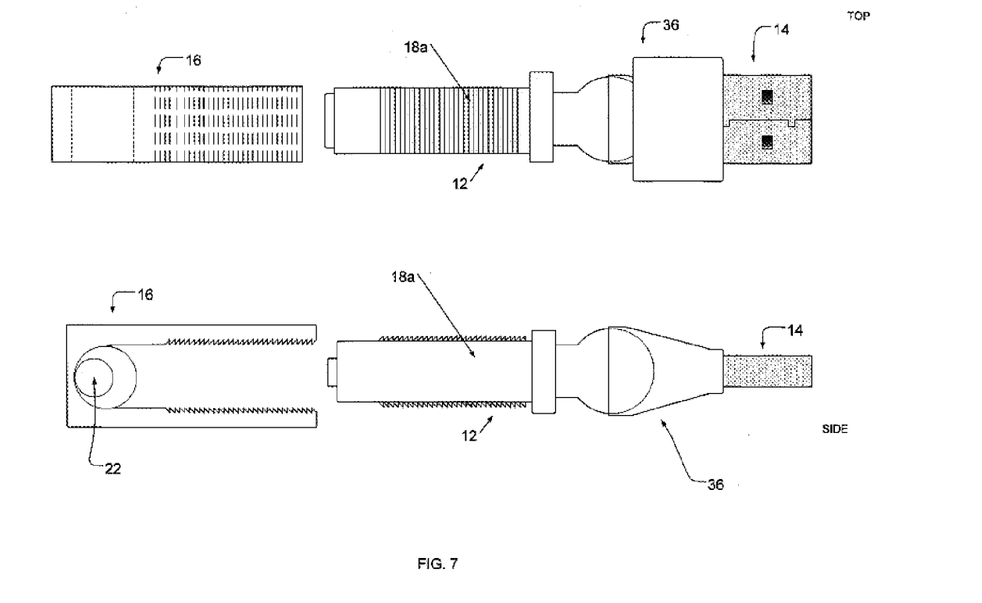

Referring to FIGS. 6 and 7, the power cord tension control device 10 may also include an adjusting component 36 for adjusting the angle of a received cable retaining structure 16 relative to the connector 14. The adjusting component 36 may operate as a mechanical hinge, which operates along a single plain or may operate along two or more planes. As non-limiting examples, the adjusting component 36 may have a two-way mechanical hinge configuration, a multi-plane mechanical hinge configuration, a ball and socket configuration, an elastic configuration or flexible configuration and the like. Thus, the degree of movement is non-limiting and can be chosen depending on the particular desires of the user.

In view of the present specification and FIG. 10, one skilled in the art can produce a power cable tension control device 10 having a proximal end capable of connecting to a computer port and a distal end capable of receiving a power cable, wherein the power cable 22 does not electrically communicate with the computer through the power cable tension control device 10 but at a remote location. In further embodiments an adjusting component 36 may be provided to allow adjustment of the distal end relative to the proximal end.

The present invention also includes a power cable tension control device kit including a power cable tension control device 10 including at least one adapter 12 and a cable retaining structure 16. Two or more adapters 12 having at least two different connectors 14 may be provided in the kit for connecting the cable retaining structure 16 to a variety of available computer ports. In alternative embodiments, the kit includes at least two power cable tension control devices 10 adapted for use with at least two different computer ports.

In another aspect of the present invention a computer cable is disclosed including a power cable tension control device 10 attached or retained thereto. One or more connectors may be utilized by interchanging one or more adapters 12.

I claim:

1. A power cable tension control device comprising:
   a) an adapter comprising a connector capable of connecting to a computer port and a male component capable of receiving a female component; and
   b) a cable retaining structure comprising a female component capable of receiving said male component and capable of receiving a power cable, wherein said power cable does not electrically communicate with a computer through said adapter,
   wherein said female component is generally U-shaped, further wherein the closed end contacts said power cable when fully received and the open end receives said male component.

2. The power tension control device according to claim 1, wherein said male component is inserted into said female component until said male component contacts said power cable.

3. The power cable tension control device according to claim 1, wherein said connector is selected from the group consisting of a 2.5 stereo jack, a 3.5 stereo jack, a 6.3 stereo jack, a BNC connector, a DB9 connector, a DB15 connector, a DB37 connector, a DB50 connector, a DVI-I connector, a Type F connector, a HDMI connector, a IEEE 1394 connector, a Mini-DIN 4 connector, a Mini-DIN 6 connector, Mini-DIN 8 connector, a Mini-DIN 13.2 connector. Mini-VGA connector, a RCA jack, a RJ11 connector, a RJ12 connector, a RJ45 connector, a USB A connector and a USB Mini A connector.

4. A power cable tension control device comprising:
   a) an adapter comprising a connector capable of connecting to a computer port and a male component capable of receiving a female component;
   b) a cable retaining structure comprising a female component capable of receiving said male component and capable of receiving a power cable, wherein said power cable does not electrically communicate with a computer through said adapter; and
   c) an adjusting component positioned between said connector and said male component, wherein said adjusting component adjusts a received female component along one or more planes.

5. The power cable tension control device according to claim 4, wherein said adjusting component is selected from the group consisting of a hinge, a ball and socket component, a mechanical joint component, and a flexible component.

6. The power cable tension control device according to claim 4, wherein said connector is selected from the group consisting of a 2.5 stereo jack, a 3.5 stereo jack, a 6.3 stereo jack, a BNC connector, a DB9 connector, a DB15 connector, a DB37 connector, a DB50 connector, a DVI-I connector, a Type F connector, a HDMI connector, a IEEE 1394 connector, a Mini-DIN 4 connector, a Mini-DIN 6 connector, Mini-DIN 8 connector, a Mini-DIN 13.2 connector, Mini-VGA connector, a RCA jack, a RJ11 connector, a RJ12 connector, a RJ45 connector, a USB A connector and a USB Mini A connector.

7. The power cable tension control device comprising:
   a) an adapter comprising a connector capable of connecting to a computer port and a female component capable of receiving a male component;
   b) a cable retaining structure comprising a male component capable of receiving said female component and capable of receiving a power cable, wherein said power cable does not electrically communicate with a computer through said adapter;
   c) an adjusting component positioned between said connector and said female component, wherein said adjusting component adjusts a received male component along one or more planes.

8. The power cable tension control device according to claim 7, wherein said adjusting component is selected from the group consisting of a hinge, a ball and socket component, a mechanical joint component, and a flexible component.

9. The power cable tension control device according to claim 7, wherein said connector is selected from the group consisting of a 2.5 stereo jack, a 3.5 stereo jack, a 6.3 stereo jack, a BNC connector, a DB9 connector, a DB15 connector, a DB37 connector, a DB50 connector, a DVI-I connector, a Type F connector, a HDMI connector, a IEEE 1394 connector, a Mini-DIN 4 connector, a Mini-DIN 6 connector, Mini-DIN 8 connector, a Mini-DIN 13.2 connector, Mini-VGA connector, a RCA jack, a RJ11 connector, a RJ12 connector, a RJ45 connector, a USB A connector and a USB Mini A connector.

* * * * *